United States Patent
Wilcox et al.

(10) Patent No.: US 11,386,602 B2
(45) Date of Patent: Jul. 12, 2022

(54) ANIMATED MONITOR AND CONTROL FOR AUTOMATED BAGGAGE HANDLING SYSTEM AND RELATED METHODS

(71) Applicant: CONTROLLOGIX, Sanford, FL (US)

(72) Inventors: Kevin Wilcox, Sanford, FL (US); Brandon Deaton, Sanford, FL (US)

(73) Assignee: CONTROLLOGIX, Sanford, FL (US)

( * ) Notice: Subject to any disclaimer, the term of this patent is extended or adjusted under 35 U.S.C. 154(b) by 0 days.

(21) Appl. No.: 16/942,272

(22) Filed: Jul. 29, 2020

(65) Prior Publication Data

US 2021/0035345 A1 Feb. 4, 2021

Related U.S. Application Data

(60) Provisional application No. 62/880,379, filed on Jul. 30, 2019.

(51) Int. Cl.
G06T 13/20 (2011.01)
B65G 43/10 (2006.01)
G06F 3/04847 (2022.01)
H04N 7/18 (2006.01)

(52) U.S. Cl.
CPC ............. G06T 13/20 (2013.01); B65G 43/10 (2013.01); B65G 2201/0264 (2013.01); G06F 3/04847 (2013.01); G06T 2200/24 (2013.01); H04N 7/181 (2013.01)

(58) Field of Classification Search
CPC ..... G06T 13/20; G06T 2200/24; B65G 43/10; B65G 2201/0264; G06F 3/04847; H04N 7/181; G06Q 10/0832
See application file for complete search history.

(56) References Cited

U.S. PATENT DOCUMENTS 3,735,853 A 5/1973 Lingg et al.
10,689,240 B1 * 6/2020 Schultz ................ B67D 1/0041
(Continued)

FOREIGN PATENT DOCUMENTS

EP 3318945 5/2018
KR 101400169 B1 * 5/2014

OTHER PUBLICATIONS

Roman Ruzarovsky et al.: "The Simulation of Conveyor Control System Using the Virtual Commissioning and Virtual Reality", Advances in Science and Technology Research Journal, val. 12, No. 4, Dec. 1, 2018 (Dec. 1, 2018), pp. 164-171.
(Continued)

*Primary Examiner* — William A Beutel
(74) *Attorney, Agent, or Firm* — Allen, Dyer, Doppelt + Gilchrist, PA

(57) ABSTRACT

A system may include a plurality of continuous conveyors configured for moving objects throughout a facility, and a plurality of sensors positioned at different locations within the facility for collecting telemetry data associated with the travel of the objects along the conveyors. The system may also include a computing device configured to store the telemetry data from the sensors in a database, generate an animation of the conveyors and the objects traveling along the conveyors within the facility based upon the telemetry data stored in the database, and play the animation on a display via a graphical user interface (GUI).

18 Claims, 8 Drawing Sheets

(56) References Cited

U.S. PATENT DOCUMENTS

| | | | |
|---|---|---|---|
| 2009/0112541 A1* | 4/2009 | Anderson | G09B 19/0076 |
| | | | 703/11 |
| 2018/0130260 A1* | 5/2018 | Schmirler | G06F 3/011 |
| 2019/0073827 A1 | 3/2019 | Coronado et al. | |
| 2019/0266806 A1* | 8/2019 | Aluru | G06K 9/00281 |
| 2020/0218899 A1* | 7/2020 | Lamont | G06T 19/006 |

OTHER PUBLICATIONS

Anonymous "Closed-circuit television—Wikipedia", Jul. 13, 2019 (Jul. 13, 2019), Retrieved from the Internet: URL:https://en.wikipedia.org/w/index.php?title=Ciosedcircuit_television&oldid=906061525.

* cited by examiner

ANIMATED MONITOR AND CONTROL FOR AUTOMATED BAGGAGE HANDLING SYSTEM AND RELATED METHODS

RELATED APPLICATIONS

This application claims the benefit of U.S. provisional application Ser. No. 62/880,379 filed Jul. 30, 2019, which is hereby incorporated herein in its entirety by reference.

TECHNICAL FIELD

The present disclosure generally relates to conveyor-based handling systems, such as airport baggage handling systems, and related methods.

BACKGROUND

Some airports utilize automated baggage handling systems to move luggage to and from passengers and airplanes. Generally speaking, a baggage handling system includes numerous conveyor belts that travel between baggage drop-off and claim locations, and the gates where passengers get on and off of the planes. Typically labels with bar codes are attached to the luggage, and scanners along the conveyer belts are able to scan the codes as they pass. A computer control system is connected to the scanners to keep track of where luggage is in the system, and can activate the pushers to move luggage from one conveyor to the next to route the luggage to its appropriate destination. Cameras may also be placed along the conveyor belts as well that are accessible via the computer control system.

One example baggage/package handling system is set forth in U.S. Pat. No. 3,735,853 to Gottstein et al. This patent discloses a system for distributing pieces of load such as baggage, parcels etc., among different destination points in an airport baggage handling system, using a closed loop conveyor system and loading and unloading stations arranged along the loop. The conveyor system includes a plurality of individual carriages wherein some of the carriages have fixed level, load carrying platform, each followed directly by at least one carriage having liftable load carrying platform, forming therewith a group, whereby the number of carriages per group is equal to the number of loading stations. A first leading station is constructed for loading the fixed level carriages from a relatively low level, and the remaining loading stations are constructed for loading the liftable carriages when lifted to a higher level, selected for permitted passage of unlifted load carrying carriages. Each loading station includes a selectively operable loading belt, extending parallel to the direction of carriage movement at the respective loading station and being speed-synchronized with the carriages and at least one carriage per group is not loaded by any individual loading station.

Despite the existence of such systems, further improvements in baggage handling and tracking configurations may be desirable in some applications.

SUMMARY

A system may include a plurality of continuous conveyors configured for moving objects throughout a facility, and a plurality of sensors positioned at different locations within the facility for collecting telemetry data associated with the travel of the objects along the conveyors. The system may also include a computing device configured to store the telemetry data from the sensors in a database, generate an animation of the conveyors and the objects traveling along the conveyors within the facility based upon the telemetry data stored in the database, and play the animation on a display via a graphical user interface (GUI).

In accordance with an example embodiment, the computing device may be configured to generate and display the animation to simulate real-time movement of the objects traveling along the conveyors. The computing device may further be configured to detect errors based upon the sensor telemetry data, and generate the animation for corresponding locations within the facility at which the errors occur responsive to the error detections. In an example implementation, the computing device may be configured to generate the animation of the objects from user-selectable virtual camera views.

By way of example, in some implementations a plurality of closed circuit television (CCTV) cameras may be positioned within the facility. As such, the computing device may be further configured to initiate CCTV playback of a user-selected CCTV camera via the GUI. In an example implementation, at least some of the sensors may be configured to generate security status data for the objects, and the computing device may be further configured to annotate the objects within the animation with respective security status information. By way of example, the animation may comprise a three-dimensional (3D) animation of the conveyors and objects traveling thereon with conveyor names displayed on respective conveyors within the animation.

In some example embodiments, the computing device may be configured to generate the animation based upon a user-selectable time window and play the animation at a user-selectable playback speed. Furthermore, the computing device may further be configured to export the animation in a video format.

A related computing device may include a memory and a processor cooperating with the memory. The processor may be configured to store telemetry data from a plurality of sensors in a database in the memory, with the sensors being positioned at different locations within the facility configured to collect telemetry data associated with the travel of the objects along conveyors within the facility. The processor may be further configured to generate an animation of the conveyors and the objects traveling along the conveyors based upon the telemetry data stored in the database, and play the animation on a display via a GUI.

A related non-transitory computer-readable medium may have computer-executable instructions for causing a computing device to perform steps including storing telemetry data from a plurality of sensors in a database in a memory, where the sensors are positioned at different locations to collect telemetry data associated with the travel of objects along conveyors within the facility. The steps may further include generating an animation of the conveyors and the objects traveling along the conveyors within the facility based upon the telemetry data stored in the database, and playing the animation on a display via a GUI.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete.

Figure 1:
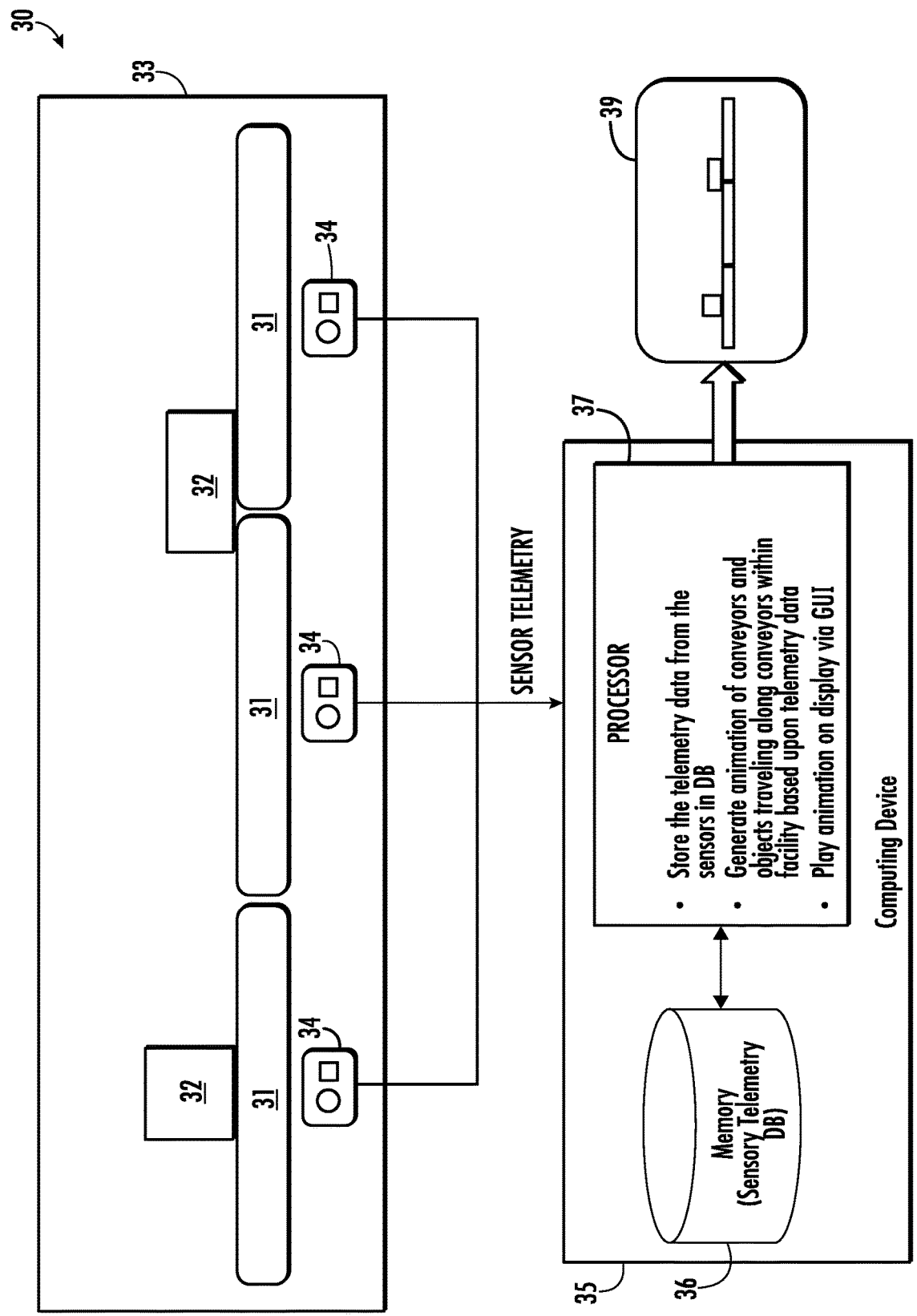
FIG. 1 is a schematic block diagram of a system for visualization of operation and faults within a conveyor-based object transport system within a facility in an example embodiment.
Figure 2:
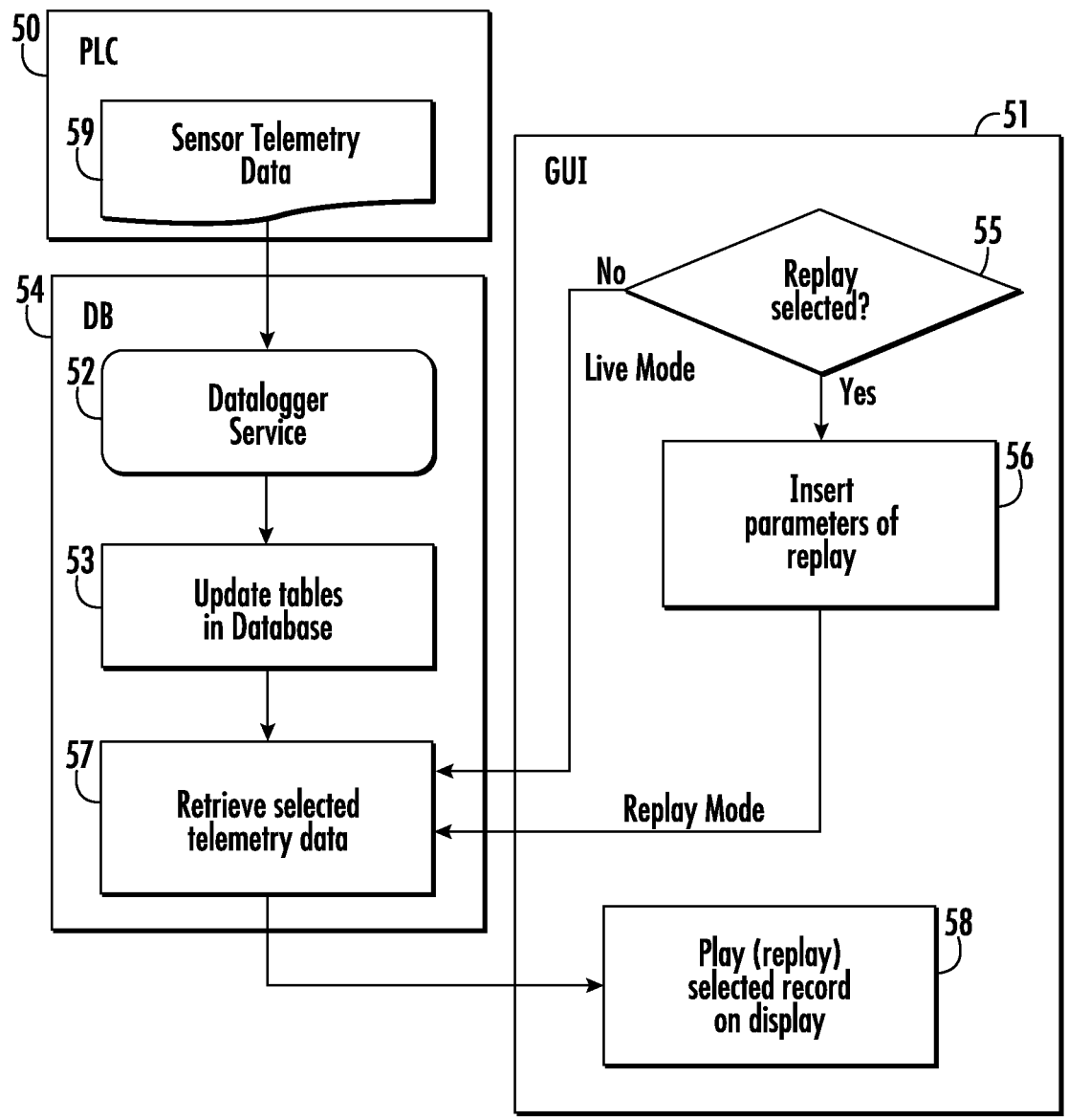
FIG. 2 is a sequence diagram illustrating example operation of certain components of the system of FIG. 1.
Figure 3:
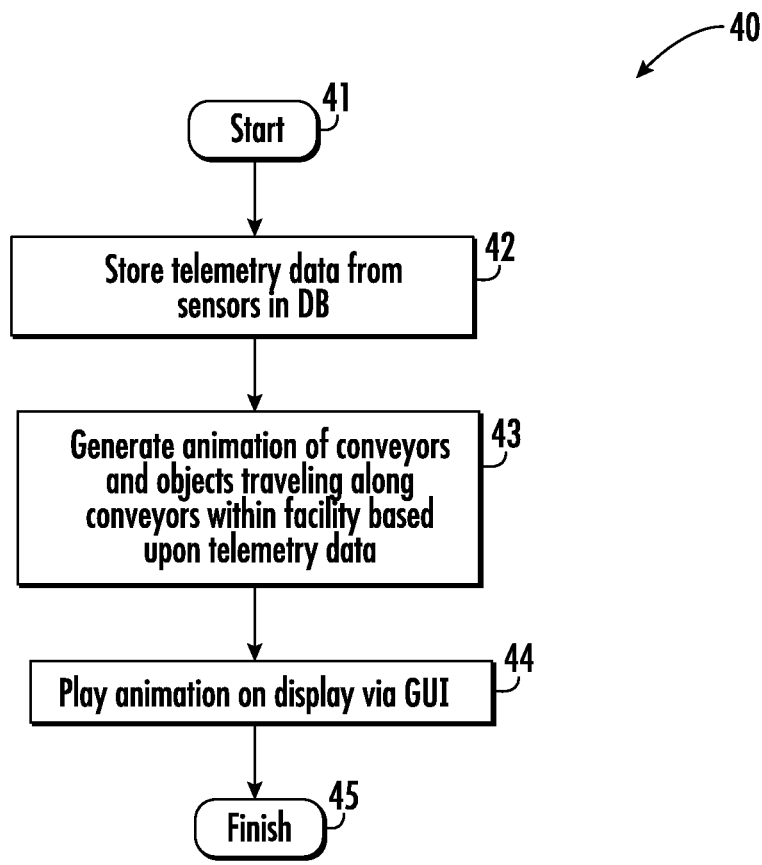
FIG. 3 is a flow diagram illustrating example method aspects associated with the system of FIG. 1.

Referring initially to FIG. 1-2 and the flow diagram 40 of FIG. 3, the present disclosure is directed a system 30 and associated method aspects providing an enhanced approach for operator visualization of system status and faults within a conveyor-based object transport system, such as an automated baggage handling system at an airport, for example. The system 30 may be considered a supervisory control and data acquisition (SCADA) system. SCADA systems are typically used to monitor and control a plant or equipment in industries such as telecommunications, water and waste control, energy, oil and gas refining and transportation.

Generally speaking, the system 30 advantageously provides animated 2D/3D scenes within the baggage (or other object) handling environment based upon live telemetry data collected from sensors 34 within the system so that operators may more readily visualize operation and understand and address problems that occur, for example. While the various examples set forth herein are provided in the context of an airport baggage handling system, it will be appreciated that the system and techniques described herein may be used in other SCADA applications as well such as those noted above, as well as package handling in a warehouse/distribution center, people moving platforms, amusement rides, etc.

The system 30 illustratively includes a plurality of continuous conveyors 31 configured for moving objects 32 (e.g., baggage, packages, etc.) throughout a facility 33. Furthermore, a plurality of sensors 34 are positioned at different locations within the facility 33 for collecting telemetry data associated with the travel of the objects 32 along the conveyors. By way of example, such sensors may include optical code readers (e.g., QR, barcode, etc.), motion sensors, laser sensors, conveyor sensors (speed, RPM, temperature, etc.), position sensors, etc. Generally speaking, the sensors 34 measure and output non-image based telemetry data about the status of the conveyors 31 (e.g., speed, operational state, etc.) and/or the status of the objects (location, type, volume, etc.) being conveyed thereon. It should be noted that the sensors 34 may also monitor other components associated with the conveyors 31 as well, such as baggage pushers, diverters, scanning devices (e.g., X-ray machines), etc.

Beginning at Block 41, the system 30 further illustratively includes a computing device 35 (e.g., a server(s)) having a memory 36 and processor 37 cooperating with the memory to store the telemetry data from the sensors 34 in a database 54 (Block 42), generate an animation of the conveyors 31 and the objects 32 traveling along the conveyors within the facility 33 based upon the telemetry data stored in the database (Block 43), and play the animation on a display 39 via a graphical user interface (GUI) 51, at Block 44. The method of FIG. 3 illustratively concludes at Block 45.

In the example embodiment illustrated in FIG. 2, a programmable logic controller (PLC) 50 collects and provides sensor telemetry data 59 to a datalogger service or module 52 which updates the associated tables in the database 54 (Block 53). As will be discussed further below, the processor 37 is operable in a "live" or real-time mode in which animations generated and displayed on the display 39 reflect the current live state of operation, or in a replay mode in which animated scenes from prior operation are displayed. In the case that the replay mode is selected by a user through the GUI 51 (Block 55), then the appropriate telemetry data is selected from the database 54 for this particular "record" based upon the parameters of the replay input through the GUI 51 (Blocks 56-57), and the processor 37 generates the corresponding animation to be replayed for this record (Block 58). On the other hand, if the live mode is selected, the then data retrieved from the database 54 would be the current data for the selected scene or area from the parameters provided through the GUI 51.

Figure 4:
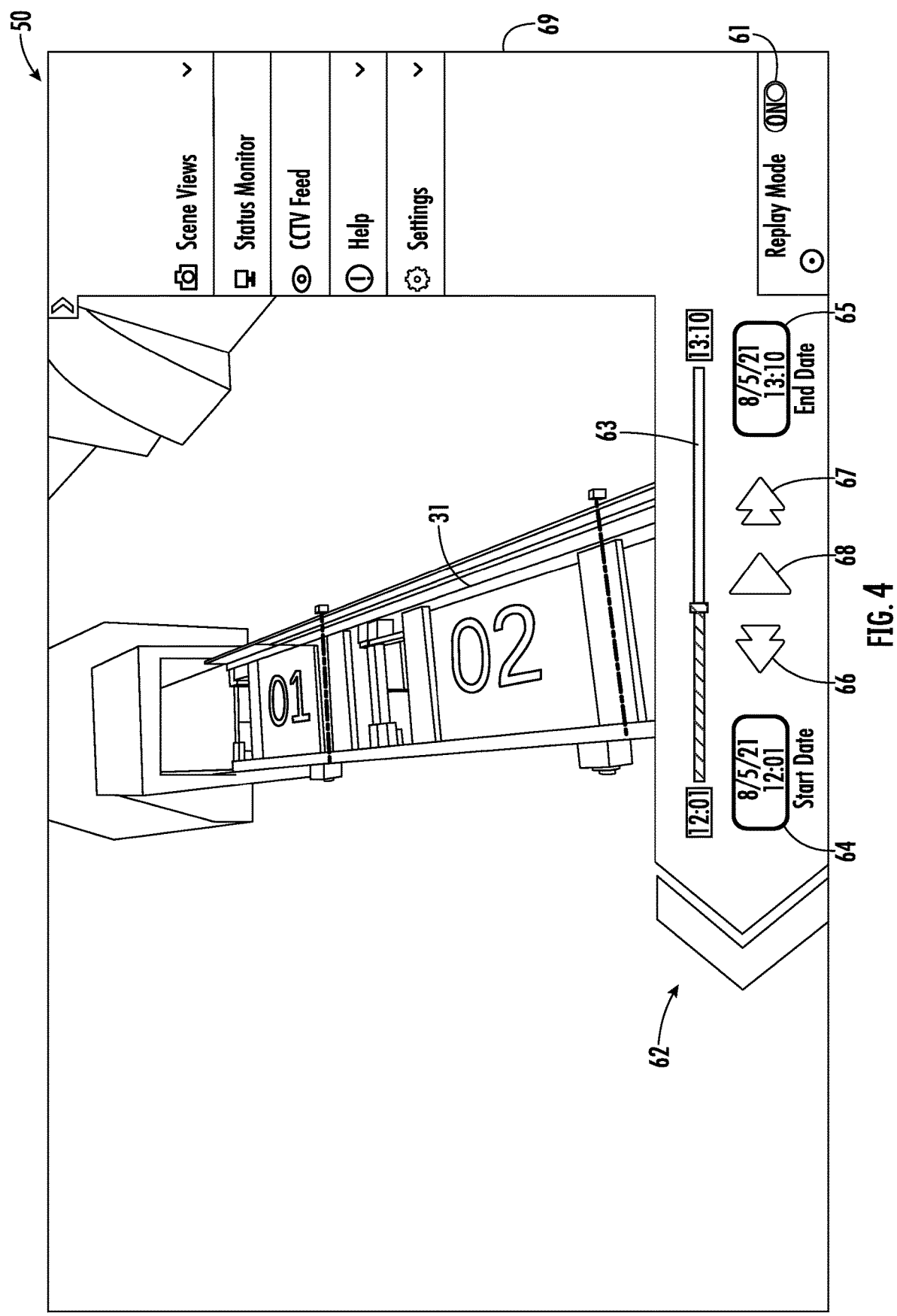
FIG. 4 is a display view of a graphical user interface (GUI) generated by the system of FIG. 1 illustrating an animated replay mode in an example embodiment.

Referring additionally to the example illustrated in FIG. 4, the replay mode feature allows for a graphical, animated, and historical playback of conveyor 31 operation for a selected period of time without requiring any additional software or system/application configuration. The GUI 50 presents the animation like a video player, and the animation representing the collected telemetry data 59 may be played in the replay (historical) mode or in real-time (in live mode), as well as at different speeds and it may also be scrubbed through. More particularly, the animation displayed on the GUI 51 can also be exported in a playable video format (e.g., MP4, AVI, MOV, FLV, WMV, etc.).

The processor 37 uses the telemetry data 59 in the database 54 to essentially "playback" the data through animated graphics, as opposed to storing screenshots image of historical points to review past system operation. This advantageously also allows for the replay mode to be used in both a live production environment and also when offline.

The datalogger service 52 may be implemented as a Windows service, and Microsoft SQL server may be used as a dependent service. The datalogger service 52 retrieves database 54 source, tables, column records, etc. The records may be used to setup communication with remote databases and define what data is logged. The datalogger service 52 may call stored procedures to log the data to the datalogger tables. From a higher-level view, the datalogger service 52 may monitor one or more groups of sensors 31 and write their telemetry data to the database 54. It may retrieve the associated metadata (e.g., group and tag records) from the database 54 on startup along with the telemetry data 59 as records. The datalogger service 52 may also collect alarm data, chart data, counter data, runtime data, etc. The records may be used to create ASComm.NET objects and define what data is logged and how. Also, the datalogger service 52 may monitor output tables and write the values to the PLC(s) 50 based on records in the output tables.

In the example of FIG. 4, the GUI 51 provides a replay mode toggle button 61 which is used to select between the live and replay modes. In the illustrated example, toggling the replay mode ON causes the GUI 51 to slide out a replay timeline widget 62, and may optionally turn the interface to a different color to emphasize that the GUI is no longer displaying the live mode. More particularly, the replay widget 62 illustratively includes a replay timeline slider 63 that can be moved around to scrub through the selected time period. The timespan of the desired replay record is defined using a start date field 64 and end date field 65. A rewind button 66 can rewind the replay playback at various speeds (e.g., ×2, ×4, ×8, ×16, ×32, . . . , where ×1=1 second). Similarly, a fast forward button 67 can fast forward the replay playback at speeds such as ×2, ×4, ×8, ×16, ×32, etc. A play/pause button 68 lets the operator play or pause the playback. In some embodiments, playback may be slowed to various speeds lower than the actual operating speed, if desired. The replay mode toggle button 61 is on a sidebar menu 69 of the GUI 51, which also allows other features to be accessed by a user, including scene views, status monitoring, closed-circuit television (CCTV) viewing, help, and settings (although other features and combinations thereof may be provided in different implementations).

A user may enter the timespan from which the baggage system data is to be retrieved via the start date field 64 and end date field 65. In an example implementation, the user may choose a timespan that is at least one hour and at most twenty-four hours, and within the same calendar day, although this day may be any day from within the past year. Of course, other allowable date/time ranges may be used in different embodiments.

Figure 5:
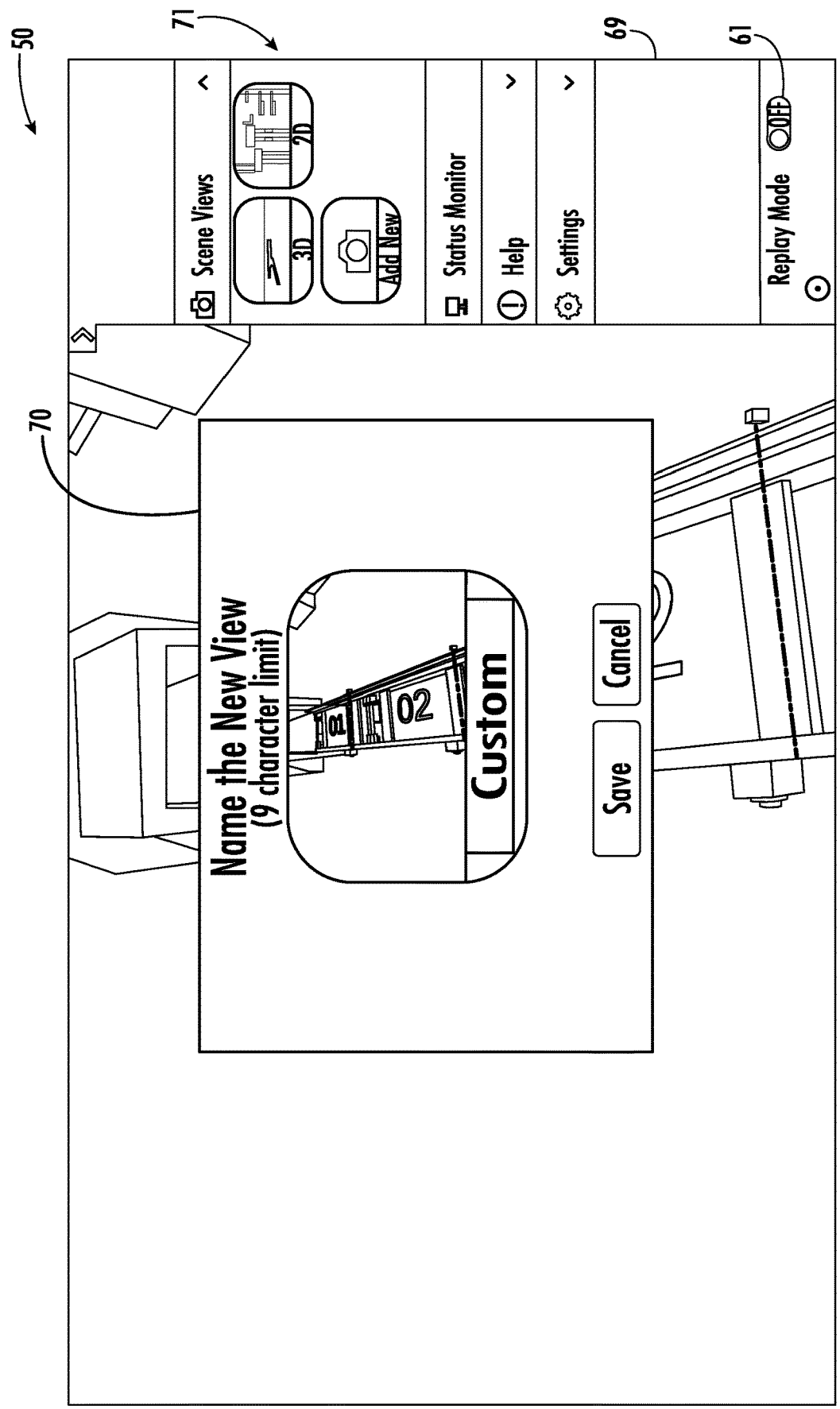
FIG. 5 is a display view of the GUI of FIG. 4 illustrating the creation of virtual camera views for viewing an animation of system operation during live or replay modes in an example embodiment.

Referring additionally to FIG. 5, in the illustrated example the GUI 51 further provides the ability to select, create, delete, and rename different virtual camera views. Clicking an "add new" camera button displays a popup window 70 that allows the operator to enter the desired name for that virtual camera. Also in the present example, different virtual camera views can be selected by simply clicking on the corresponding scene view thumbnail 71. When a user clicks the "add new" camera button, the scene view is opened for the operator to position the "virtual camera" to get the desired scene view within the animation by panning or zooming using a mouse, keyboard, track pad, etc.

The operator may navigate the 3D/2D animation using the virtual camera, in which conveyor 31 (or other device) details appear and disappear based on distance from the device. For example, the closer the virtual camera is to the device, the more details may be shown in the GUI 51. For example, in FIG. 4, respective IDs (01, 02) of two conveyors 31 are shown superimposed on the conveyors. However, if the virtual camera is zoomed far enough out (e.g., where the labels can no longer be rendered in large enough text to read), then these labels are no longer displayed within the animation. Other information which may be displayed within the animation includes object information, facility information, etc.

Figure 6:
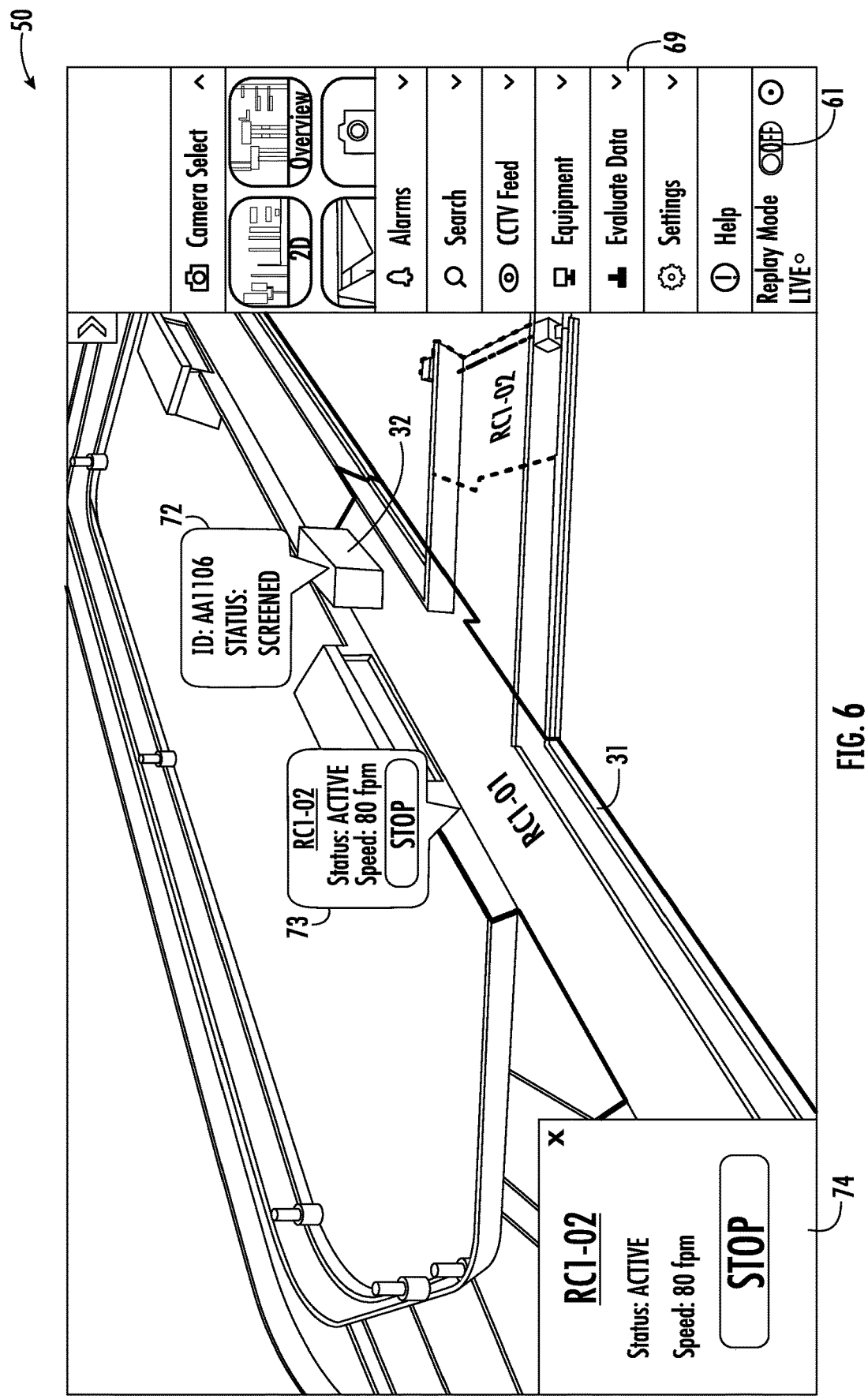
FIG. 6 is a display view of the GUI of FIG. 4 illustrating device and object information labeling within the animation of system operation in an example embodiment.

The animated scene from the perspective of any given virtual camera includes object 32 movement throughout the facility 33 (either in real time or in a historical replay). The objects 32 move from conveyor 31 to conveyor in real time against operational data. In an example embodiment shown in FIG. 6, ID and security status of respective objects 32 are also be viewable within the animated scene (here in a popup text bubble 72). The illustrated object 32 has been assigned an ID AA1106, and its security status is "clear" (e.g., it has already passed through baggage screening). Similarly, a popup text bubble 73 displays operational telemetry data regarding one of the conveyors 31 within the given virtual camera view. In the illustrated example, the conveyor 31 has been assigned an ID RC1-01, its status is "active", and its operating speed is 100 fps. Another popup window 74 shows the status of a different conveyor 31 in the scene, namely RC1-02 which has an active status and an operating speed of 80 fpm. Both of the popup bubble 73 and window 74 include a "stop" button which allows the operator to freeze or pause playback of conveyor 31 operation in the animation at any time (this button may change to a "start" button after being paused to resume playback). Other operational data may also be displayed for the objects 32 and conveyors 31 (or other devices) within the virtual camera view as well in some embodiments.

Figure 7:
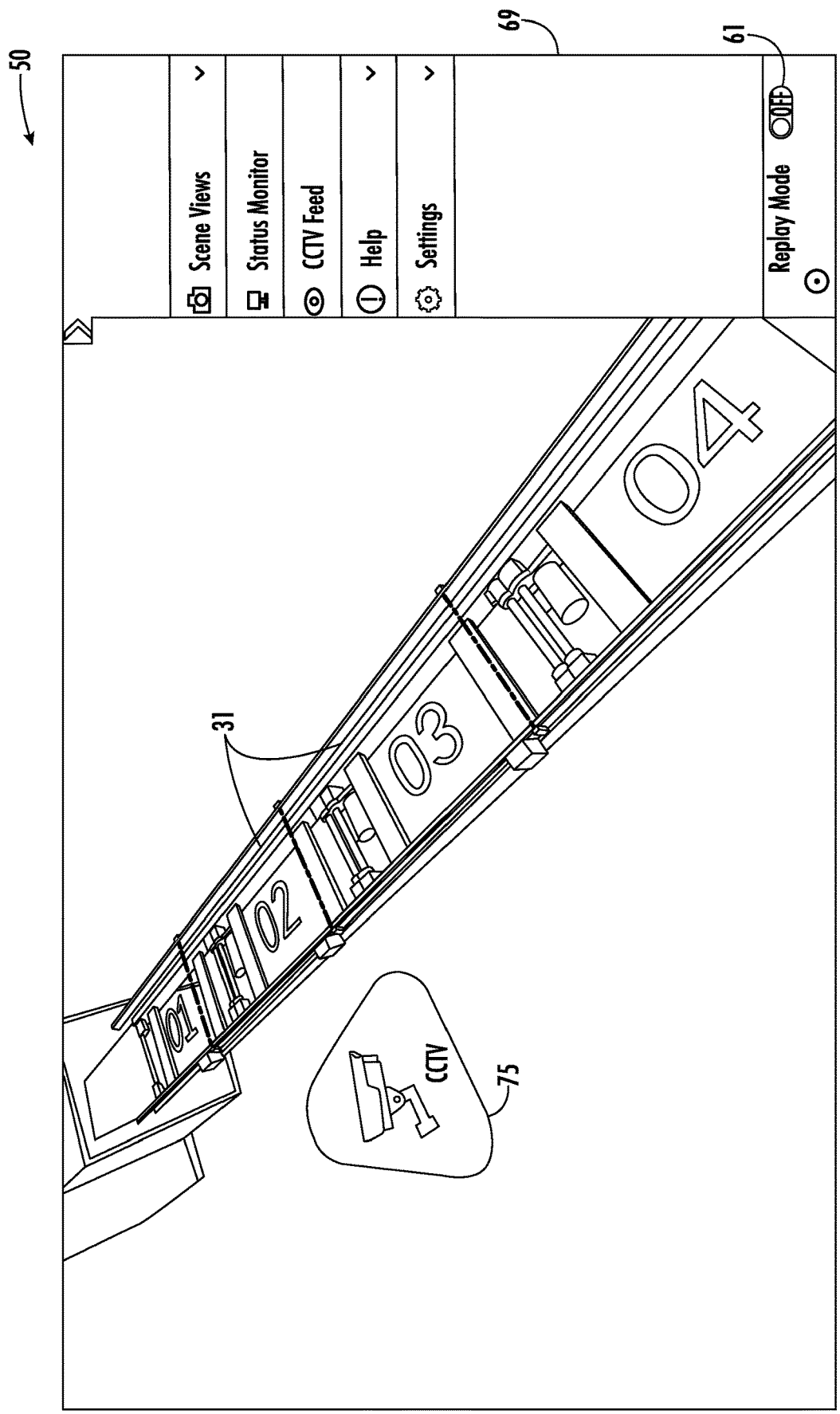
FIG. 7 is a display view of the GUI of FIG. 4 providing access to a closed-circuit television (CCTV) system within the facility in an example embodiment.

Referring additionally to FIG. 7, in the illustrated example the GUI 51 provides an interface to a CCTV system within the facility 33. Herein, a CCTV icon 75 is provided within the animation to inform the user where the actual CCTV camera is located within the facility 33, and upon selection the processor 37 sends a command the CCTV system to display the selected camera. For example, a window may be opened in which the live camera video from this CCTV camera is superimposed within the GUI, or a separate window (or program) may be used for viewing the camera feed. It should be noted that in some embodiments, the processor 37 may allow the operator to manually control devices such as CCTV cameras (e.g., pan and zoom), as well as other devices such as conveyors 31, diverters, etc. This may be done by providing a separate portal equipment control screen. Current status and command options may be provided through the portal, and security permissions may also be set so that only authorized users are permitted to control appropriate devices.

Figure 8:
FIG. 8 is a table generated by the computing device of FIG. 1 of errors determined from sensor telemetry data in an example embodiment.

Turning to FIG. 8, in some embodiments the PLC 50 may be further be configured to detect errors based upon the sensor telemetry data. Here, various errors are being displayed as alerts within an "alarms" window 80 that illustratively includes a time the alarm occurred, the name of the device the alarm occurred on, the name/type of the alarm, and a detailed description of what the alarm is. Upon selecting one of the errors, an animation corresponding to the time set and the device of interest may accordingly be presented by the GUI 51, as described further above. For example, the PLC 50 may automatically select a virtual camera view in which the device in question for the selected error is visible (or the virtual camera corresponding to the closest position to the device within the facility 33).

An example communication network architecture in which the computing device 35 may be implemented will now be described. The architecture may be subdivided into three major levels, namely the host, the upper level, and the machine level. The host network may be an Ethernet TCP/IP communication network that connects to the upper level control system. This network is used for, in the case of an airport baggage system, owner provided baggage information, as well as remote support connectivity, for example. The upper level network may be a local area Ethernet TCP/IP communications network used for communications between the upper level controls and the machine level controls, as well as upper level intercommunications. The computing device 35 may be implemented at the upper level, for example. The machine level is where device level communications (conveyors 31, pushers, etc.) occur.

The above-described system 30 may advantageously provide interoperability and compliance with the requirements of modern SCADA systems. Moreover, the system 30 may advantageously help cut operational response time dramatically by helping to ensure fast and reliable animated graphics to visualize SCADA system operation, as well as relatively simple deployment to numerous devices.

The various operations described herein may also be implemented in a non-transitory, computer-readable medium having computer-executable instructions for performing the noted operations. Moreover, it should also be noted that while the example animation views shown herein are 3D views, in some implementations the virtual camera views may be 2D. For example, such 2D views may resemble a "birds-eye" or overhead view of the conveyors 31 and objects 32 in a part or all of the facility 33.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A system comprising:
    a plurality of continuous conveyors configured for moving objects throughout a facility;
    a plurality of sensors positioned at different locations within the facility for collecting telemetry data associated with travel of the objects along the conveyors, at least some of the sensors being configured to determine whether the objects have passed through a security screening; and
    a computing device configured to
        store the telemetry data from the sensors in a database,
        generate an animation of the conveyors and the objects traveling along the conveyors within the facility based upon the telemetry data stored in the database and including status annotations that follow at least some of the objects as they switch between different conveyors, the status annotations including security status information to indicate whether respective objects have passed through the security screening, and
        play the animation on a display via a graphical user interface (GUI).

2. The system of claim 1 wherein the computing device is configured to generate and display the animation to simulate real-time movement of the objects traveling along the conveyors.

3. The system of claim 1 wherein the computing device is further configured to detect errors based upon the sensor telemetry data, and in response generate the animation for corresponding locations at which detected errors occur within the facility.

4. The system of claim 1 wherein the computing device is configured to generate the animation from user-selectable virtual camera views.

5. The system of claim 1 wherein a plurality of closed circuit television (CCTV) cameras are positioned within the facility; and wherein the computing device is further configured to initiate CCTV playback of a user-selected CCTV camera via the GUI.

6. The system of claim 1 wherein the animation comprises a three-dimensional (3D) animation of the conveyors and objects traveling thereon with conveyor names displayed on respective conveyors within the animation.

7. The system of claim 1 wherein the computing device is configured to generate the animation based upon a user-selectable time window and play the animation at a user-selectable playback speed.

8. The system of claim 1 wherein the computing device is further configured to export the animation in a video format.

9. A computing device comprising:
    a memory and a processor cooperating with the memory and configured to
        store telemetry data from a plurality of sensors in a database in the memory, the sensors being positioned at different locations throughout a facility and being configured to collect telemetry data associated with travel of objects along conveyors within the facility, at least some of the sensors being configured to determine whether the objects have passed through a security screening,
        generate an animation of the conveyors and the objects traveling along the conveyors within the facility based upon the telemetry data stored in the database and including status annotations that follow at least some of the objects as they switch between different conveyors, the status annotations including security status information to indicate whether respective objects have passed through the security screening, and
        play the animation on a display via a graphical user interface (GUI).

10. The computing device of claim 9 wherein the processor is configured to generate and display the animation to simulate real-time movement of the objects traveling along the conveyors.

11. The computing device of claim 9 wherein the processor is further configured to detect errors based upon the sensor telemetry data, and in response generate the animation for corresponding locations at which detected errors occur within the facility.

12. The computing device of claim 9 wherein the processor is configured to generate the animation from user-selectable virtual camera views.

13. The computing device of claim 9 wherein a plurality of closed circuit television (CCTV) cameras are positioned within the facility; and wherein the processor is further configured to initiate CCTV playback of a user-selected CCTV camera via the GUI.

14. A non-transitory computer-readable medium having computer-executable instructions for causing a computing device to perform steps comprising:
    storing telemetry data from a plurality of sensors in a database, the sensors being positioned at different locations throughout a facility and being configured to collect telemetry data associated with travel of objects along conveyors within the facility, at least some of the sensors being configured to determine whether the objects have passed through a security screening;
    generating an animation of the conveyors and the objects traveling along the conveyors within the facility based upon the telemetry data stored in the database and including status annotations that follow at least some of the objects as they switch between different conveyors, the status annotations including security status information to indicate whether respective objects have passed through the security screening; and
    playing the animation on a display via a graphical user interface (GUI).

15. The non-transitory computer-readable medium of claim 14 generating comprises generating the animation to simulate real-time movement of the objects traveling along the conveyors.

16. The non-transitory computer-readable medium of claim 14 further having computer-executable instructions for causing the computing device to perform a step of detecting errors based upon the sensor telemetry data; and wherein the generating comprises, in response to the detecting errors, generating the animation for corresponding locations at which the detected errors occur within the facility.

17. The non-transitory computer-readable medium of claim 14 wherein generating comprises generating the animation of the objects from user-selectable virtual camera views.

18. The non-transitory computer-readable medium of claim 14 wherein a plurality of closed circuit television (CCTV) cameras are positioned within the facility; and further having computer-executable instructions for causing the processor to perform a step comprising initiating CCTV playback of a user-selected CCTV camera via the GUI.

* * * * *

UNITED STATES PATENT AND TRADEMARK OFFICE
CERTIFICATE OF CORRECTION

PATENT NO. : 11,386,602 B2
APPLICATION NO. : 16/942272
DATED : July 12, 2022
INVENTOR(S) : Wilcox et al.

It is certified that error appears in the above-identified patent and that said Letters Patent is hereby corrected as shown below:

On the Title Page

Item (71) Applicant: Delete: "ControlLogix"
Insert: --ControLogix--

Signed and Sealed this
Twenty-second Day of November, 2022

*Katherine Kelly Vidal*

Katherine Kelly Vidal
*Director of the United States Patent and Trademark Office*